(12) United States Patent
Byrd et al.

(10) Patent No.: US 8,167,081 B2
(45) Date of Patent: May 1, 2012

(54) DUAL MODE HYDROSTATIC STEERING SYSTEM

(75) Inventors: William A. Byrd, Owasso, OK (US); David L. Finck, Janesville, IA (US)

(73) Assignee: Deere & Company, Moline, IL (US)

( * ) Notice: Subject to any disclaimer, the term of this patent is extended or adjusted under 35 U.S.C. 154(b) by 136 days.

(21) Appl. No.: 12/613,894

(22) Filed: Nov. 6, 2009

(65) Prior Publication Data

US 2011/0108353 A1    May 12, 2011

(51) Int. Cl.
*B62D 5/09* (2006.01)
(52) U.S. Cl. ..................................................... 180/441
(58) Field of Classification Search .................. None
See application file for complete search history.

(56) References Cited

U.S. PATENT DOCUMENTS

| | | | |
|---|---|---|---|
| 4,213,511 A * | 7/1980 | Rubenstein et al. .......... | 180/420 |
| 4,553,390 A * | 11/1985 | Liebert et al. .................. | 60/384 |
| 4,759,182 A | 7/1988 | Haarstad | |
| 5,136,844 A * | 8/1992 | Stephenson et al. ........... | 60/384 |
| 6,149,410 A * | 11/2000 | Cooper ........................... | 418/32 |
| 6,863,147 B2 | 3/2005 | Catellani | |
| 7,980,354 B2 | 7/2011 | Thomsen et al. | |
| 7,997,379 B2 | 8/2011 | Kryhlmand et al. | |
| 2009/0114469 A1 * | 5/2009 | Thomsen et al. ............. | 180/441 |
| 2009/0199915 A1 * | 8/2009 | Novacek et al. ......... | 137/625.23 |

FOREIGN PATENT DOCUMENTS

| | | |
|---|---|---|
| DE | 19935021 | 2/2000 |
| DE | 102006010695 | 9/2007 |
| DE | 102007053024 | 5/2009 |
| GB | 2 341 159 | 7/1998 |
| GB | 2341159 | 8/2000 |

* cited by examiner

*Primary Examiner* — Tony Winner

(57) ABSTRACT

A hydrostatic steering system has a steering cylinder for coupling to steerable wheels, a gerotor pump, a steering valve and an actuator controlled mode select valve. The steering valve is mechanically and hydraulically coupled to the gerotor pump, and controls fluid communication between the gerotor pump and the steering cylinder. The steering valve has a center position wherein communication between the gerotor pump and the steering cylinder is closed. The actuator controlled mode select valve controls fluid communication between the gerotor pump and the steering cylinder independently of the steering valve.

7 Claims, 1 Drawing Sheet

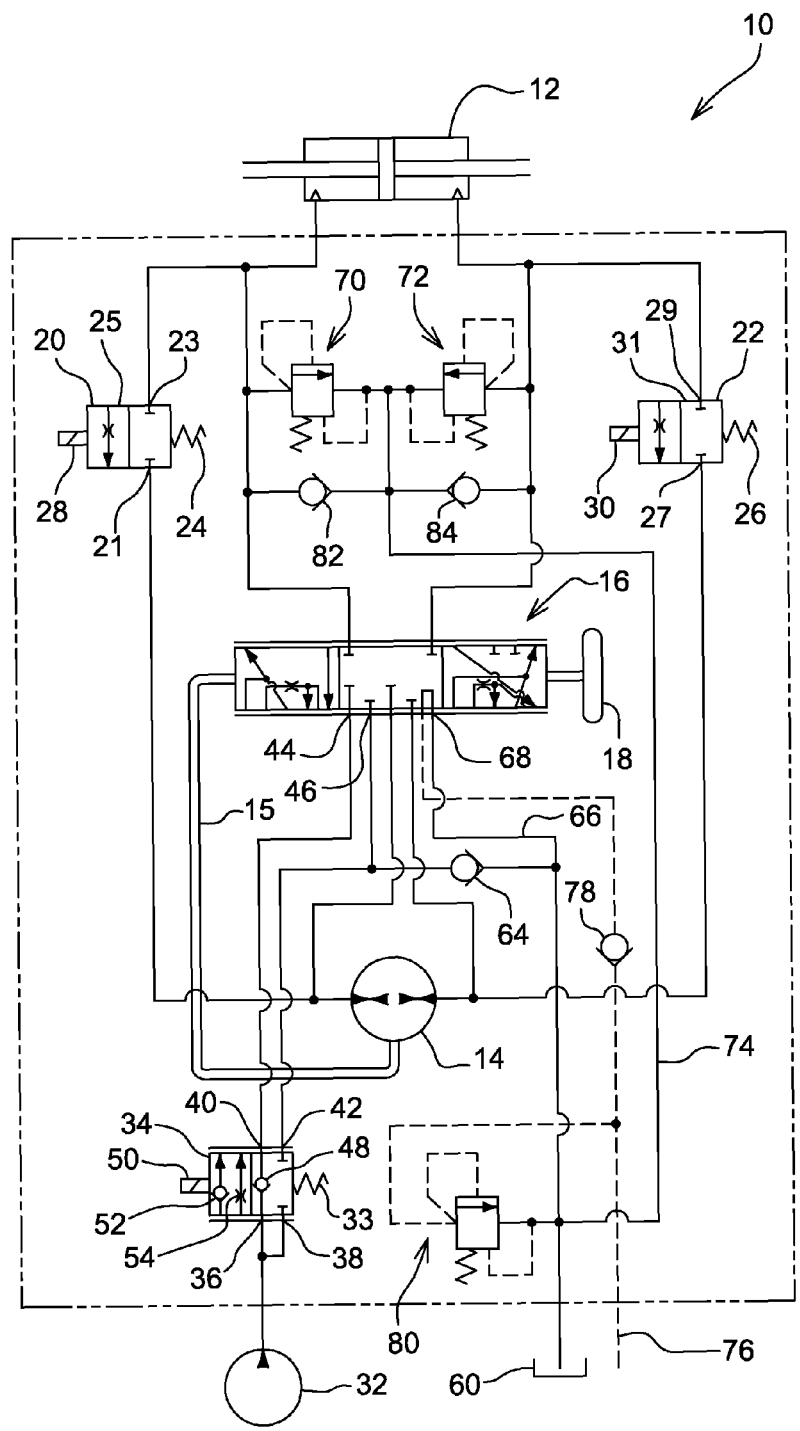

DUAL MODE HYDROSTATIC STEERING SYSTEM

FIELD OF THE INVENTION

The present invention relates to a hydrostatic steering system.

BACKGROUND OF THE INVENTION

It is known to provide a vehicle with a hydrostatic steering system. A hydrostatic steering system typically includes a gerotor pump mechanically and hydraulically connected to a steering valve, and a steering cylinder which is hydraulically connected to the steering valve. There are load reactive hydrostatic steering systems wherein the gerotor pump is hydraulically connected to the steering cylinder by the steering valve when the valve is in its center position. There are also non-load reactive hydrostatic steering systems wherein the gerotor pump is not hydraulically connected to the steering cylinder by the steering valve when the valve is in its center position. It would be desirable to provide a steering system which can easily be switched between non-load reactive and load reactive modes.

Patent application GB 2341159, published on 8 Mar. 2000 and assigned to Ognibene, shows a hydrostatic steering system with selectable reactive and non-reactive modes. However, in the Ognibene system the steering valve is an open center valve wherein, when the steering valve is in its center position, fluid flows through the steering valve to mode select valves.

SUMMARY OF THE INVENTION

Accordingly, an object of this invention is to provide a steering system which has a closed center steering valve and which can be easily switched between non-reactive and reactive operational modes.

This and other objects are achieved by the present invention, wherein a vehicle steering system includes a steering cylinder for coupling to steerable wheels, a gerotor pump, an operator controlled steering input member, and a steering valve mechanically and hydraulically coupled to the gerotor pump. The steering valve controls fluid communication between the gerotor pump and the steering cylinder. The steering valve has a center position wherein fluid communication is closed between the gerotor pump and the steering cylinder. One or more mode select valves, separate from the steering valve, are provided for selectively controlling fluid communication between the gerotor pump and the ports of the steering cylinder independently of the steering valve.

BRIEF DESCRIPTION OF THE DRAWINGS

The sole FIGURE is a schematic diagram of a dual mode vehicle hydrostatic steering system embodying the invention.

DESCRIPTION OF THE PREFERRED EMBODIMENT

Referring to the sole FIGURE, a vehicle hydrostatic steering system 10 includes a steering cylinder 12 for coupling to steerable wheels (not shown). The steering cylinder 12 has having left and right input ports L and R. The system 10 also includes a known conventional gerotor pump 14. A known conventional rotary steering valve 16 is mechanically coupled to the gerotor pump 14 by mechanical link 15 and is hydraulically coupled to the gerotor pump 14, and is hydraulically coupled to the steering cylinder 12. Steering valve 16 controls fluid communication between the gerotor pump 14 and the steering cylinder 12 in a known manner. A known operator controlled steering input member 18, such as a steering wheel is preferably mechanically coupled to the steering valve 16. The steering valve 16 is non load reactive because in its center position communication is closed between the gerotor pump 14 and the steering cylinder 12. The, the steering valve 16 is a closed center load sensing steering control valve.

According to the invention, mode select valves 20 and 22 are connected between respective outputs of the gerotor pump 14 and the respective L and R ports of the steering cylinder 12. Mode select valve 20 includes a first port 21 connected to a corresponding port of the gerotor pump 14, a second port 23 connected to the left port L of the steering cylinder 12, and a valve member 25 movable from a closed position wherein communication is closed between the first and second ports to an open position wherein communication is open between the first and second ports. Mode select valve 22 includes a first port 27 connected to a corresponding port of the gerotor pump 14, a second port 29 connected to the right port R of the steering cylinder 12, and a valve member 31 movable from a closed position wherein communication is closed between the first and second ports to an open position wherein communication is open between the first and second ports.

Each of the valves 20 and 22 is biased to a closed position by a respective spring 24 and 26, wherein communication is closed between the respective port of gerotor pump 14 and the respective R and L port of steering cylinder 12. Each valve 20 and 22 has a respective actuator 28, 30 which can be selectively operated to move each valve to an open position communication is open between the respective port of gerotor pump 14 and the respective R and L port of steering cylinder 12. The actuators 28, 30 are preferable electrical actuators, such as solenoids as shown in the FIGURE, but the actuators could be hydraulic or mechanical actuators. Optionally, instead of two separate valves 20 and 22, there could be a single mode select valve (not shown) to control communication between the ports of gerotor pump 14 and the L and r ports of the steering cylinder 12. The valves 20 and 22 could also be actuated electrically, hydraulically, or manually. Optionally, there could also be multiple steering cylinders.

Pump pressure from a pump 32 is communicated to one or more inlets 44 and 46 of the steering valve 16 though an optional solenoid operated two-position flow amplification valve 34. Valve 34 has inlets 36 and 38 connected to the pump 32 and outlets 40 and 42 connected to inlets 44 and 46 of the steering valve 16. A spring 33 biases valve 32 to a first position wherein inlet 36 is connected to outlet 40 via a check valve and where inlet 38 is blocked. An actuator, such as a solenoid 50 is operable to move valve to a second position wherein inlet 36 is connected to outlet 40 via a check valve 52 and wherein inlet 38 is connected to outlet 42 via a restriction or orifice 54.

A tank or reservoir 60 is connected to steering valve inlet 46 via a check valve 64. Tank 60 is connected to steering valve inlet 68 via line 66, and to pressure relief valves 70 and 72 via line 74. A load sense line 76 is connected to inlet 70 of steering valve 16 via check valve 78 and to a load sensing port of a load sense relief valve 80, which communicates the load sense line 76 to tank 60 when the pressure in load sense line 76 exceeds a certain limit pressure. Pressure relief valves 70 and 72 via line 74 connect the L and R ports of steering cylinder 12 to tank 60 when the pressure therein exceeds a limit pressure. Check valves 82 and 84 prevent fluid flow from ports L and R to tank line 74.

Thus, the system 10 is non-load reactive when valves 20 and 22 are closed, because the gerotor pump 14 is not hydraulically connected to the steering cylinder 12 by the steering valve 16 when the steering valve 16 is in its center position. The system 10 can be load reactive if valves 20 and 22 are open when the steering valve 16 is in its center position, because the gerotor pump 14 will then be hydraulically connected to the steering cylinder 12 by the valves 20 and 22. Thus, the steering system 10 can easily be switched between non-load reactive and load reactive modes. Valves 20 and 22 function as mode select valves which control fluid communication between the gerotor pump 14 and the ports of the steering cylinder 12, independently and outside of the steering valve 16. An electronic control unit (not shown) can be configured to control the solenoids 28 and 30 in the desired manner.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A vehicle steering system, comprising:
   a steering cylinder for coupling to steerable wheels, the steering cylinder having left and right ports;
   a gerotor pump;
   a steering valve mechanically and hydraulically coupled to the gerotor pump, the steering valve controlling fluid communication between the gerotor pump and the steering cylinder, the steering valve having a center position wherein communication through the steering valve between the gerotor pump and the steering cylinder is closed; and
   a mode select valve for controlling fluid communication between the gerotor pump and the ports of the steering cylinder independently and outside of the steering valve.

2. The steering system of claim 1, wherein the mode select valve comprises:
   a first actuator controlled mode select valve for controlling fluid communication between the gerotor pump and the left port of the steering cylinder independently of the steering valve; and
   a second actuator controlled mode select valve for controlling fluid communication between the gerotor pump and the right port of the steering cylinder independently of the steering valve.

3. The steering system of claim 2, wherein:
   each mode select valve comprises a first port connected to a corresponding port of the gerotor pump, a second port connected to one of the steering cylinder ports, a valve member movable from a closed position wherein communication is closed between the first and second ports to an open position wherein communication is open between the first and second ports, a spring biased to urge the valve member to its closed position, and an actuator selectively operable to move the valve member to its open position.

4. The steering system of claim 1, further comprising:
   a hydraulic pump; and
   a two-position flow valve for controlling communication between the hydraulic pump and an inlet of the steering valve.

5. The steering system of claim 1, further comprising:
   an operator controlled steering input member mechanically coupled to the steering valve.

6. A vehicle steering system, comprising:
   a steering cylinder for coupling to steerable wheels, the steering cylinder having left and right ports;
   a gerotor pump;
   a steering valve mechanically and hydraulically coupled to the gerotor pump, the steering valve controlling fluid communication between the gerotor pump and the steering cylinder, the steering valve having a center position wherein communication between the gerotor pump and the steering cylinder is closed;
   a first actuator controlled mode select valve for controlling fluid communication directly between the gerotor pump and the left port of the steering cylinder independently of the steering valve; and
   a second actuator controlled mode select valve for controlling fluid communication directly between the gerotor pump and the right port of the steering cylinder independently of the steering valve.

7. The steering system of claim 6, wherein:
   each mode select valve comprises a first port connected to a corresponding port of the gerotor pump, a second port connected to one of the steering cylinder ports, a valve member movable from a closed position wherein communication is closed between the first and second ports to an open position wherein communication is open between the first and second ports, a spring biased to urge the valve member to its closed position, and an actuator selectively operable to move the valve member to its open position.

* * * * *